United States Patent
Pike et al.

(10) Patent No.: US 7,101,430 B1
(45) Date of Patent: Sep. 5, 2006

(54) MASONRY, MORTAR, AND STUCCO CEMENT COMPOSITIONS

(75) Inventors: Clinton W. Pike, Cypress, TX (US); David H. Nordmeyer, Castroville, TX (US)

(73) Assignee: Headwaters Resources, Inc., South Jordan, UT (US)

(*) Notice: Subject to any disclaimer, the term of this patent is extended or adjusted under 35 U.S.C. 154(b) by 371 days.

(21) Appl. No.: 10/088,291

(22) PCT Filed: Sep. 21, 2000

(86) PCT No.: PCT/US00/25907

§ 371 (c)(1),
(2), (4) Date: Jul. 29, 2002

(87) PCT Pub. No.: WO01/23317

PCT Pub. Date: Apr. 5, 2001

Related U.S. Application Data

(60) Provisional application No. 60/155,861, filed on Sep. 24, 1999.

(51) Int. Cl.
C04B 7/02 (2006.01)
C04B 7/12 (2006.01)
C04B 7/13 (2006.01)

(52) U.S. Cl. .................................... 106/705; 106/713

(58) Field of Classification Search ............... 106/705, 106/713
See application file for complete search history.

(56) References Cited

U.S. PATENT DOCUMENTS

| 4,268,316 A | 5/1981 | Wills, Jr. |
| 5,374,308 A | 12/1994 | Kirkpatrick et al. |
| 5,536,310 A | 7/1996 | Brook et al. |
| 5,681,384 A | 10/1997 | Liskowitz et al. |
| 5,725,652 A | 3/1998 | Shulman |
| 5,766,338 A | 6/1998 | Weber |
| 5,772,752 A | 6/1998 | Liskowitz et al. |
| 5,928,420 A | 7/1999 | Oates et al. |

*Primary Examiner*—Elizabeth D. Wood
(74) *Attorney, Agent, or Firm*—Wegman, Hessler & Vanderburg

(57) ABSTRACT

This invention pertains to a process of making ASTM quality masonry cement, mortar cement, and stucco cement (also called plastic cement) and to the products themselves which are useful in making ASTM quality mortar for masonry construction or ASTM quality stucco for plastering construction. These cements are classified as hydraulic cements and are made using selected pozzolan(s), such as natural pozzolan and fly ashes, Portland Cement, hydrated lime, and an air-entraining agent. Other additives, such as fibers, may be added to further modify its properties. The pozzolans act as functional ingredients in the mix rather than as a filler. As a result, concentrations of greater than 25 wt. % and more pozzolan can be produced.

15 Claims, No Drawings

MASONRY, MORTAR, AND STUCCO CEMENT COMPOSITIONS

CROSS-REFERENCE TO RELATED APPLICATIONS

Priority filing benefit of (1) International PCT application PCT/US00/25907 filed Sep. 21, 2000, and published under PCT 21(2) in the English language and (2) U.S. Provisional Application Ser. No. 60/155,861 filed Sep. 24, 1999.

FIELD OF THE INVENTION

This invention pertains to a process of making ASTM quality masonry cement (ASTM C-91), mortar cement (ASTM C-1329), and stucco cement (also called plastic cement) (ASTM-1328) and to the products themselves which are useful in making ASTM quality mortar for masonry construction or ASTM quality stucco for plastering construction. These cements are classified as hydraulic cements and comprise a pozzolan(s), such as natural pozzolan and fly ashes, Portland Cement, hydrated lime, and an air-entraining agent. Other additives, such as fibers, may be added to further modify properties.

BACKGROUND OF THE INVENTION

Historically, mortar and stucco was made by mixing lime putty with sand and water on a job site. The lime putty typically was made at the job-site from quick lime and water, but prior to use, it had to be aged for several months in an earthen pit. Additives were added to the mortar or stucco to change its behavior and permanence. These additives included pozzolans, blood, animal fiber, vegetable fiber, cactus juices, and clay, to name some of the more common ones. This method was conventional up to the late 19th century.

These mortars and stuccos had only a compressive strength of about fifty to a few hundred pounds per square inch after 28 days, but they continued to gain strength for many months. They also tended to remain flexible and maintained good bond (as related to the compressive strength) and maintained excellent extent of bond. As a result, water penetration through walls at the brick/mortar interface was slight. Further, excess hydrated lime in the system led to autogenous healing in the event a crack occurred at the brick/mortar interface. Disadvantageously, this mortar and stucco took an extended time to cure. As such, only a few rows of brick could be laid per day, and a brown coat could not be added to the scratch coat on a stucco application for a week or more.

With the advent of Portland Cement in the later part of the 19th century, small amounts were added to the mortars and stuccos to reduce the time of set. With time, larger amounts of Portland Cement were added to further reduce the time of set. A positive effect of the added cement was increased early compressive strength. This higher compressive strength was equated with higher quality. However, higher compressive strengths generally correspond to less flexibility of the mortar and, thus, a more brittle characteristic. As such, in areas with high wind, or other loads, this may not be a desirable characteristic. Regardless, these mortars and stuccos tended to maintain good bond and maintain excellent extent of bond. Also, autogenous healing occurred in these cement/lime mortars such that water penetration through walls at the brick/mortar interface was slight.

Improvement to the 19th century technology occurred in the early 1930's when finely divided hydrated lime became available in bags. This resulted in the lime not having to be slurried and aged on the job-site, or if it was, the time of aging was reduced to a matter of days.

As a convenience to the tradesmen using a mortar, masonry cement was developed and was marketed in the 1930's. The masonry cement of the 1930's typically consisted of cement clinker and limestone ground together with vinsol resin as an air-entraining agent and as a grinding aid. This product allowed the tradesman to mix the masonry cement, sand, and water to obtain a mortar. This eliminated the need to produce lime putty on the job site and reduced the potential for errors in mixing hydrated lime and Portland Cement. The proportions of the cement clinker and the limestone would be adjusted to produce an acceptable compressive strength To make the mortars workable, as much as 22% air was entrained into the mortars. The amount of entrained air was regulated by the amount of vinsol resin added to the mix before milling Unfortunately, the limestone and entrained air did not provide bond. Therefore, the bond strength of mortars and stuccos made with this masonry cement usually was not very good. Also, there was little or no unreacted hydrated lime in the system, and since the Portland Cement in the system was usually fully hydrated, autogenous healing did not occur. The cement, which provided a non-flexible binder, further aggravated the problem. With movements of the wall, the extent of bond could gradually be decreased. Accordingly, numbers of individuals and companies have developed improvements to masonry cement and mortar, as well as to stucco and other hydraulic cements over the years.

Definitions that are used commonly in the industry and as will be used throughout the instant specification and claims are as follows:

Where "ASTM" prefaces a paragraph, the definition in that paragraph was taken directly from an ASTM standard.

Air Content (of Freshly Mixed Mortar)

ASTM The volume of air (or other gas) voids in freshly mixed cement mortar usually expressed as a percentage of total volume of the mortar.

Air Entraining Agent

A chemical that is blended with a cement to increase the amount of entrained air in the mortar or concrete mix. Vinsol resin and various sulfonates are commonly used.

Cement, Hydraulic

ASTM A cement that sets and hardens by chemical interaction with water and is capable of doing so under water.

Portland cement is a hydraulic cement.

Cement, Hydraulic, Blended

A hydraulic cement that is produced by blending two or more components and meets either ASTM C-595 or ASTM C-1157. Type IP cement is made by blending a pozzolan with a Portland cement Cement, Masonry ASTM A hydraulic cement for use in mortar for masonry and plastering construction, containing one or more of the following materials: Portland cement, Portland blast furnace slag cement, Portland-pozzolan cement, natural cement, slag cement, or hydraulic lime; and in addition usually containing one or more materials such as hydrated lime, limestone, chalk, calcareous shell, talc, slag, or clay as prepared for this purpose.

Cement Mortar

A mixture of cement, sand, and water, and possibly other ingredients, into a paste like consistency.

Cement, Mortar

ASTM A hydraulic cement, primarily used in masonry construction, consisting of a mixture of Portland blended hydraulic cement and plasticizing materials (such as limestone or hydrated or hydraulic lime), together with other materials introduced to enhance one or more properties such as setting time, workability, water retention, and durability.

Cement, Plastic

ASTM A hydraulic cement, primarily used in Portland cement-based plastering construction, consisting of a mixture of Portland or blended hydraulic cement and plasticizing materials (such as limestone or hydrated or hydraulic lime) together with other materials introduced to enhance one or more properties such as setting time, workability, water retention, and durability.

Cement, Portland

ASTM A hydraulic cement produced by pulverizing Portland-cement clinker, and usually containing calcium sulfite.

A cement that meets the ASTM C-150 standard.

Cement, Portland, Clinker

ASTM A clinker, partially fused by pyroprocessing, consisting predominately of crystalline hydraulic calcium silicates.

Cement Portland Type I

A Portland cement for general use.

Cement, Portland Type II

A Portland cement designed to provide moderate sulfate resistance.

Cement, Portland Type III

A Portland cement designed to provide high early strength.

Cement, Portland Type IV

A Portland cement designed to provide low heat of hydration

Cement Portland Type V

A Portland cement designed to provide high sulfate resistance.

Cement, Stucco

Same as plastic cement Stucco cement tends to be used in the east and plastic cement tends to be used in the west

CMU

Concrete masonry unit. This can range from concrete block to concrete brick.

Concrete

ASTM A composite material that consists essentially of a binding medium within which are embedded particles or fragments of aggregate; in hydraulic-cement concrete, the binder is formed from a mixture of hydraulic cement and water.

Fly Ash

ASTM The finely divided residue that results from the combusting of ground or powdered coal and that is transported by flue gases Fly Ash, Class C ASTM Fly ash normally produced from lignite or subbituminous coal that meets the applicable requirements for this class as given herein. This class of fly ash, in addition to having pozzolanic properties, also has some cementitious properties. (ASTM C618)

Class C fly ash usually consists of a mixture of amorphous silica and alumina and crystalline calcium-silicates and calcium-aluminates Fly Ash, Class F ASTM Fly ash normally produced from burning antracite or bituminous coal that meets the applicable requirements for the class as given herein. This class fly ash has pozzolanic properties. (ASTM C-618)

Texas lignite also produces a Class F fly ash. Class F fly ash usually consists of a mixture of amorphous silica and alumina.

Fly Ash, Martin Lake

A Class F fly ash produced at the Martin Lake Power Plant near Tatum, Tex. The plant burns Texas lignite.

Fly Ash, Parish

A Class C fly ash produced at the Parish Power Plant near Houston, Tex.

Fly Ash, Rockdale

A Class F fly ash produced at the ALCOA Power Plant near Rockdale, Tex. The plant burns Texas lignite.

Lime

Lime is a general term that includes all forms of burned lime: quick lime, hydrated lime, and hydraulic lime. Limestone and precipitated calcium carbonate are occasionally erroneously referred to as lime.

Lime, Hydrated

ASTM A dry powder obtained by treating quicklime with water enough to satisfy its chemical affinity for water under the conditions of its hydration.

Lime, Hydrated, Dolomitic

Hydrated lime that contains a significant amount of magnesium.

Usually it contains 35% to 40% magnesium compounds (usually MgO and $Mg(OH)_2$) and 60% to 65% calcium compounds (usually CaO and $Ca(OH)_2$). Since it is more difficult to hydrate the magnesium compounds, this lime, when used for masonry purposes, is usually pressure hydrated Lime, Hydrated, Double Hydrated lime that has been produced by a pressure hydrator. The lime has not been hydrated twice, but this is the vernacular of the trade.

Life, Hydrated, High CALCIUM

Hydrated lime that contains in excess of 95% calcium compounds.

Lime, Hydrated, Magnesian

Hydrated lime that contains between 5% and 35% magnesium compounds and 65% and 95% calcium compounds.

Lime, Hydrated, Pressure

Hydrated lime that has been produced by a pressure hydrator.

Lime, Hydrated, Type N

ASTM Normal hydrated lime for masonry purposes.

ASTM C-207 does not have a requirement on un-hydrated oxides, or for plasticity.

Lime, Hydrated, Type S

ASTM Special hydrated lime for masonry purposes.

ASTM C-207 limits the un-hydrated oxides to 8% and requires a plasticity figure of not less than 200 within 30 minutes of mixing with water.

Lime, Putty

Lime putty is quick lime that has been slaked and stored in a putty consistency for an extended period of time. The traditional method was to slake and store in a covered ditch (18" wide by 36" deep and covered with ^" soil) for 6 months or more. The process produced maximum workability since all or most hard-to-hydrate particles were fully hydrated. In more recent years water is added to hydrated lime in containers and it is stored for a few days prior to use.

Masonry

A general term for brick, stone, block or other similar materials combined with a mortar.

Mortar

A mix consisting of usually a cementitious binder and a fine aggregate that is used to position and hold brick, block, stone, or other similar materials into permanent position.

Polymers

Modifiers for mortar and stucco that add one or more special properties. Those properties in fresh mortar are usually related to entrained air, amount of water needed, or water retention. In set mortars those properties are usually related to flexural bond, water absorption, or water resistance.

Pozzolan

A substance which in itself is not a cement but when combined with moisture and hydrated lime under ambient temperature conditions will produce cementitious properties. Pozzolans are usually amorphous silica, amorphous compounds will be slightly dissolved and then will combine with the calcium source to form hydrated mono-, di-, and tri-calcium silicates, aluminates, and ferrates. These are the same compounds that form when Portland cement is hydrated.

Pozzolan, Class C

A man-made pozzolan that meets the standards defined in ASTM C-618. The combination of the concentrations of silica, alumina, and iron are between 50% and 70%. Usually this class of pozzolan has some natural cementing properties from the calcium silicates, aluminates, and ferrates that it contains. Examples of Class C pozzolans include fly ashes made with sub-bituminous coal, such as Wyoming coal, and some lignites.

Pozzolan, Class F

A man-made pozzolan that meets the standards defined in ASTM C-618. The combination of the concentrations of silica, alumina, and iron are between 70% and 100%. Usually this class of pozzolan does not have substantial natural cementing properties. Examples of Class F pozzolans includes fly ashes made from anthracite coal and the Texas lignites.

Pozzolan, Natural

A pozzolan that occurs naturally. Such pozzolans include volcanic tuffs, volcanic ash, diatomaceous earth, some clay as well as other substances. Processing of natural pozzolans may include crashing, milling, drying, calcining, and air separation.

Pozzolan, Rio Grande, Class N

Rio Grande Pozzolan was one of the first natural pozzolans that was commercially produced in the United States. A natual pozzolan that was produced by Pozzolana, Inc. from volcanic ash in Starr County (Rio Grande City, IX), Tex. from the early 1950s through the 1960s. We periodically obtain samples of this volcanic ash and process it in the lab following the same procedure used by Pozzolana, Inc.

Pozzolanic Activity Index

An ASTM test where 20% of the Portland cement in a mix is replaced with the pozzolan to be tested. The pozzolanic activity index is the percentage of strength the replacement mix reaches at 7 days and 28 days when compared with a non-replacement mix. A minimum pozzolanic activity index of 70%/o is required after 7 days and 28 days. With this replacement level to a great extent the test reveals that the pozzolan passing this test does not have deleterious properties. Ground limestone with no pozzolanic properties has been known to pass the test. Discussions are underway to modify the test to require a higher level of substitution, possibly as high as 35%.

Stucco

A finish which traditionally is applied in three coats. A scratch coat, a brown coat, and a texture or finish coal Stucco, Brown Coat The second coat of stucco that is applied to a lath. It is used as a thickness builder and a leveling coat.

Stucco, Finish Coat

The third coat of stucco that is applied to a lath. It is used as a color coat and/or a texture coat.

Stucco, Scratch Coat

The first coat of stucco that is applied to a lath. It is usually scratched with horizontal striations to assist in a physical bond to the second coat.

Tri-Modal Particle Distribution

Normal particle distribution of a substance is a bell curve or a spike. With some fly ashes, the particle size distribution contains two or three spikes. With these spikes, the packing factor increases and the resulting packed fly ash has fewer voids than a product with a normal type distribution. Fewer voids usually equate to less water penetration through the mix.

Today mortar and stucco generally are defined as a mixture consisting of usually a cementitious binder, a fine aggregate, and water. A mortar typically is used to position and hold brick, block, stone, or other similar materials in to permanent position. A stucco typically is a finish which traditionally is applied in three coats and is used in plastering construction.

The cementitious binder in mortar can comprise hydraulic cements such as masonry cement (ASSM C-91) and mortar cement (ASTM C-1329), and the like, and in stucco can comprise hydraulic cements, such as stucco cement (ASTM-1328), and the like. Hydraulic cements simply are cements that set and harden by chemical interaction with water and are capable of doing so under water. These hydraulic cements typically are comprised of a variety of components including among other things Portland Cement and pozzolan(s), such as natural pozzolan, fly ash Class "F", or combinations of "F" and fly ash Class "C". Accordingly, numerous varieties of hydraulic cements exist today with one providing different advantages over the next.

Regardless of the numerous varieties of cements, this invention manages to improve upon the conventional technology of today by creating a balanced hydraulic cement composition comprising a pozzolan(s), Portland Cement, hydrated lime, and an air-entraining agent. The compositions of the invention meet the rigorous tests set forth for example in ASTM C-91 "N" and "S", C-1329 "N"; 1328"S" and other ASTM testing procedures. At the same time, the mixes are relatively inexpensive due to the inclusion of extremely high ranges of fly ash and/or type "N" pozzolan therein.

In comparison testing of this invention using ASTM testing guidelines against other conventional masonry, mortar, and stucco cements, the mortars and stuccos produced by this invention required less mixing water, were less likely to effloresce, were less likely to develop fungal and algal growth, were more water resistant, exhibited autogenous healing continued to gain strength for over one yea when tested according to ASTM test procedures, were less likely to leak under high wind and rain conditions, and were less likely to burn the tradesmen's hands since the amount of alkali oxides and hydroxides are lower.

SUMMARY OF THE INVENTION

ASTM quality hydraulic cement compositions, such as masonry, mortar, and stucco cement, are made by combining a pozzolan(s), Portland Cement, hydrated lime, and conventional air-entraining agents. Other additives, such as fibers, may be added to further modify properties of the mortar or stucco. The components in these compositions are balanced such that one can utilize a majority of the components in reactions to produce a hydraulic cement having characteristics that create ASTM quality mortars and stucco that surpass those used today.

In this invention, specific high level pozzolan(s) are selected as functional ingredients for each hydraulic cement rather than as filler. The pozzolans used are either a high level natural pozzolan (type "N"), a high level fly ash Class "F", or a combination of high level Class "F" and high level fly ash Class "C". As a result, concentrations from 40–70% pozzolans can be preferably produced where over 90% of the hydraulic cement composition is a functional ingredient and is contributing to producing bond strength. Also, Type I Portland Cement is the preferred cement, and hydrated "S" lime primarily is used with the fly ashes and "N"lime primarily is used with the natural pozzolans.

Certain types of Class "F" or "C" fly ash and a Type "S" lime can produce a greatly improved mortar or stucco. Specifically, it has been discovered that the use of a high pozzolanic activity Class "F" fly ash, which has a pozzolanic activity of 98% of control or better with 20% replacement and with carbon contents under 1%, with a double hydrated Class "S" Lime can produce an exceptional quality stucco or mortar that performs equal to or better than stucco's that have polymer added. The total cement content for the mix is less than or equal to 30% for Type "S" ASTM mortar, which is unheard of, and less than or equal to 20% with Type "N." Furthermore, the same type of Class "F" pozzolan/fly ash when blended with a better than 24% CaO content Class "C" fly ash can reduce the required cement content to under 20% while meeting the above ASTM Type "W" or "S" mortar requirements.

Type N pozzolans can use Type "N" lime but they do not have all the properties found with the Class "F" or "T"/"C" combinations. Nonetheless, balanced hydraulic cements containing type "N" pozzolans used in mortars and stuccos exceed the performance of those currently used.

These high level pozzolan cements also have the ability to impact fungi and algae resistance to the stucco and mortar produced due to the soluble metal ions (specifically Cr, B, Se) that act as biocides at levels around 1–10 ppm that are released from the surface of the fly ash, when exposed to water. It was also discovered that a Class "F" fly ash that has a tri-modal particle size distribution, and a packed unit weight of 105 lb/ft$^3$ or more creates a mortar or a stucco that is almost water proof. The waterproof nature of the mortar and stuccos was found to come from the diversification produced with the Class "F" or "C" pozzolan which has a tri-modal particle size distribution with $\geq 3\%$ by volume a $\geq 1$ micron for the first mode. This packing factor along with the high pozzolanic reactivity index of $\geq 90\%$ are the two reasons the mortar and stucco's produced are virtually waterproof without adding any reagents to handle the problem.

The keys to these discoveries are the pozzolan quality which is based on the pozzolanic activity index, carbon content, tri-modal particle distribution, and soluble surface metals found in specific pozzolans that release metals at certain ppm levels to inhibit fungi and algae growth.

With regards to the process of making the hydraulic cements, the amount of lime needed to satisfy the lime demand of the pozzolan must be determined along with the amount of lime produced by the hydration of the Portland cement. Calculations are made to determine the appropriate balanced starting components of pozzolan Portland cement, and hydrated lime.

The starting formulas are then tested in the laboratory and appropriated dosage rates for air entraining agents are determined. The lime content and Portland Cement content are then adjusted to obtain the appropriate water retention and compressive strength. The final test of a mortar or stucco is workability by a master craftsman. Slight adjustments may be necessary from the balanced formula to enhance the workability.

DETAILED DESCRIPTION OF THE PREFERRED EMBODIMENT

The following components are used:

Hydrated Lime

ASTM C-207 Type S hydrated or double hydrated lime is used with a Class "F" or "C" fly ash Either high calcium or a dolomitic hydrated lime will work in this invention. If a dolomitic hydrated lime is used, the amount of calcium hydroxide present in the lime is required for calculations in developing a balanced formula Specifically, the CLC and APG hydrated limes preferably are used with Class F and F/C combinations and Austin White lime is used with Class N pozzolans.

Air-entrained hydrated limes (re. Type SA lime) are usually counter-productive to use. Also, mixing two different air-entraining agents is usually not recommended. The air content of a hydrated lime is tested by measuring the amount of air that is entrained into a standard mortar. The amount of air that can be entrained with these limes is lower than the ASTM standards require for masonry cement, mortar cement, and stucco cement.

Pozzolan

Exemplary pozzolans include a Class N, Class F, or Class "F" & "C" combination of pozzolan that meets the requirements of ASTM C-618 are used.

Preferably these components also have:

A 28-day strength activity index with Portland cement (20% replacement) of 95%,

A 28-day strength activity index with Portland cement (35% replacement) of 85%,

A calcium concentration in Class "C" fly ash (as reported as CaO) of less than 35% but $\geq 20\%$, A water demand of less than 100%, A fineness of not more than 24% retained on the 45 micron sieve, A tri-modal particle size distribution with a $\geq 3\%$ by volume $\geq 1$ micron, Water soluble surface chemistry of: 0.01–1 ppm Cr; 5–200 ppm Se; and 50–500 ppm B, Carbon contents of <1% with a foam index of less than 10 drops.

If the water retention is high, a proportion of the Class N or Class F pozzolan can be replaced with Class C fly ash. Such a replacement will result in a reduction of the amount of Portland cement that is required but may require an increase in the amount of hydrated lime used.

The pozzolans act as functional ingredients in the mix rather than as a filler. As a result, concentrations from 40% to 70% pozzolans can be preferably produced where over 90% of the hydraulic cement is a functional ingredient and is contributing to producing bond strength.

Fly ashes are more variable than most natural pozzolans. Therefore, to reduce the amount of variability in the fly ash, one can use fly ash from two or more fly ash silos.

Preferably, Martin Lake fly ash produced at the Martin Lake Power Plant near Tatum, Tex. and Rockdale fly ash produced at ALCOA Power Plant near Rockdale, Tex. are used as the Class "F" fly ash Preferably, Parish fly ash produced at the Parish Power Plant near Houston, Tex. is used as the Class "C" fly ash. And, preferably, Rio Grande Pozzolan is used as the Class N pozzolan. Of course, the artisan will appreciate that other Class "C" and Class "F" fly ash sources can be employed and other Class "N" pozzolan sources may be used in accordance with the invention.

Portland Cement

Preferably, a Portland Cement (ASTM C-150) rather than a blended cement is used in composing the invention. A blended cement will work with a lower pozzolan replacement but the manufacturer of the cement produced with this invention has less control over the product since one cannot choose the pozzolan used. As such, the concentrations of the components may be adjusted for cement strength without one's knowledge. If the manufacturer of the blended cement uses high concentrations of a Class C pozzolan, it may not be possible to obtain adequate water retention in the mortar produced.

Most preferably, an ASTM Type I Portland Cement should be used that has as low an alkali content as is available. The higher the alkali content of the cement, the more likely that the cement will cause alkali burns on the skin of the tradesmen who use the product. The Type I Sun Belt, Capitol, and Texas Lehigb Portland Cements are most preferred When Portland Cement hydrates, calcium hydroxide is liberated. Usually the amount of calcium hydroxide produced is equal to about 20% of the mass of the Portland Cement. Failure to tie the calcium hydroxide up with an excess of pozzolan can result in permanent efflorescence forming. To note, magnesium hydroxide does not react as readily as calcium hydroxide. In making calculations with dolomitic and high-magnesium lime, assume that the calcium hydroxide will be reactive and the magnesium hydroxide will not be reactive.

Type II and Type V Portland Cements may be used where sulfate resistance is an issue.

Type III Portland Cement should not be used. Type III Portland Cement produces high Portland strengths but does not impact the speed with which the pozzolans react. Lime liberation by a Portland Cement is roughly related to the gain in compressive strength As a result, Type III cements can produce an excess of calcium oxide in the mortar before the majority of the reaction water has been absorbed. This can lead to permanent efflorescence.

Type IV Portland Cement can be used, but there are no advantages in using it and may be some disadvantages in its use in cold weather.

Air-Entraining Agent

Any of the commercially available air-entraining agents for mortars such as that sold by Hercules under the "vinsol resin" designation may be used. Other air entrainment agents include anionic surfactants such as polyoxyethylene alkyl ether sulfates or polyoxyethylene alkyl phenyl ether sulfates or salts thereof, polyoxyethylene alkyl phenyl ether sulfates or salts thereof, polyoxyethylene alkyl ether phosphates or polyoxyethylene alkyl phenyl ether phosphates or salts thereof, alkylbenzenesulfonic acids or salts thereon alpha-olefinic-sulfonic acids or salts thereof, fatty acids or salts thereof, polyoxyethylene polyalcohol fatty acid esters, polyethylene glycol fatty acid esters, polyoxyethylene pentacrythryritol fatty acid esters and polyoxyethylene sorbitan fatty acid esters and the fatty acids or salts thereof. These are all reported in U.S. Pat. No. 5,725,652. At present, an anionic detergent available from Acme Soap Co., San Antonio, Tex. is preferred. Testing with the foam index test and the proposed air-entraining agent will indicate whether any component in the mix works in opposition to the air-entraining agent. A dry powder air-entraining agent is easier to blend into the mix, however, with appropriate equipment, a liquid air-entraining agent can be used.

Fibers

Fibers optionally may be used in stucco, but are not usually used in mortars. Monofilament polypropylene fibers are preferred over other fibers since they are not effected by the alkalis in the mixed stucco. These fibers also dispersed readily and lay down well for finishing.

Development of Balanced Formula

To calculate the initial formula, apply the following formula:

$$[\text{Pozzolan}] = \frac{([\text{Portland}] \times [\text{Portland Lime Production}]) + [\text{Ca(OH)}_2]}{\text{Pozzolan Lime Demand}}$$

Portland lime production and pozzolan lime demand are both expressed as decimal fractions. Concentrations can be in pounds, grams, or other units. After the concentrations are developed, they can be converted to percentages using mathematics.

If materials are used where the Portland lime production is 0.20 and the pozzolan lime demand is 0.35, then the following percentages will be close to stoichiometrically balanced:

| | |
|---|---|
| Portland Cement | 35% |
| High Calcium Hydrated Lime | 12% |
| Pozzolan | 53% |

The balanced formula is then tested in the laboratory for compressive strength, air entrainment, water retention, and workability, using blended ASTM sand.

Development of Final Formulas

The next step is to adjust the air-entraining agent in the laboratory to produce the optimum entrained-air concentration for the application. ASTM standards list entrained air limits for different cements. Increasing the entrained-air content increases the yield of the mortar (lays more brick), makes the mortar fluffier, and lowers the compressive strength. Impact of adding entrained air on the compressive strength of a mortar can be calculated using Ferret's Law:

$$S=K(c/[c+e+a])^2$$

S predicted compressive strength
K constant
c absolute volume of cement
e absolute volume of water
a absolute volume of air After the entrained air is adjusted, the other components can be adjusted to the standards that the formula is required to meet. When using a Class F pozzolan, the concentration of the pozzolan has a greater impact on the amount of air-entraining agent needed than the concentrations of the other components.

If greater strength is needed, simply add more Portland Cement or change the ratio of Class "F" to Class "C". Ferret's Law is not appropriate for adjusting the cement concentration since Portland Cement, the pozzolan, and the hydrated lime all impact the compressive strength.

If greater workability is needed, add more hydrated lime or increase the air content slightly. Usually workability is not a problem when a Class F fly ash or "F"/"C" combination is used that meets ASTM recommendations since the ash particles are rounded and tend to act as miniature ball bearings thereby adding to the workability.

If greater sand-carrying capacity is needed, add more hydrated lime.

After the balanced hydraulic cements were composed, they were tested against competing products using ASTM guidelines. By combining the determined amount of each component of the hydraulic cement and adjusting the air-entraining agent to produce the optimum concentration to form a balanced composition, the resulting ASTM quality mortars and stuccos produced from this invention required less mixing water, were less likely to effloresce, were less likely to develop fungal and algal growth, were more water resistant, were less likely to leak under high wind and rain conditions, and were less likely to burn the tradesmen's hands since the amount of alkali oxides and hydroxides are lower. Additionally, the resulting mortars and stuccos also contain about 75–95% by weight cementitious materials, and are very resistant to acid/chemical attack. As such, they make an excellent concrete patch material.

Also, specifically, the mortar produced with this invention and tested with the ASTM E-514 test (Water Penetration Test) resisted leakage for over 24 hours. The test method specifies a 4 hour test. Many conventional mortars failed to resist the penetration of water for four hours.

Stucco's produced with this invention do not require expensive polymers to give the spreadability, bonding, and strength that the majority of stucco's require.

EXAMPLES

The following compositions in accordance with the invention were prepared.

Example 1

Pozzolanic Masonry Cement Type "N"

| | |
|---|---|
| Martin Lake Fly Ash - Class "F" | 63% |
| Sun Belt Portland Type 1 | 25% |
| CLC Hydrated Lime, Type S - NB | 12% |
| Air Entraining Agent | to achieve 14% mortar air content |

Example 2

Pozzolanic Masonry Cement Type "S"

| | |
|---|---|
| Martin Lake Fly Ash - Class "F" | 50% |
| Sun Belt Portland Type 1 | 38% |
| CLC Hydrated Lime, Type S - NB | 12% |
| Air Entraining Agent | to achieve 14% mortar air content |

Example 3

Pozzolanic Plastic (Stucco) Cement Type "S"

| | |
|---|---|
| Martin Lake Fly Ash - Class "F" | 46% |
| Sun Belt Portland Type 1 | 43% |
| CLC Hydrated Lime, Type S - NB | 11% |
| Air Entraining Agent | to achieve 12% mortar air content |

Example 4

Masonry Mortar Mix Type N

| | |
|---|---|
| Rockdale Fly Ash - Class "F" | 50% |
| Texas Lehigh Portland Cement Type I | 33% |
| APG Hydrated Lime Type SA | 17% |

Example 5

ASTM C-91 Type N Masonry Cement

| | |
|---|---|
| Martin Lake Fly Ash | 63% |
| Sun Belt Portland Type 1 | 25% |
| CLC Hydrated Lime, Type S | 12% |
| Air Entraining Agent | to achieve 14% mortar air content |

Example 6

ASTM C-91 Type N-Masonry Cement

| | |
|---|---|
| Martin Lake Fly Ash | 50% |
| Sun Belt Portland Type 1 | 22% |
| Parish Fly Ash - Class "C" | 14% |
| APG Hydrated Lime, Type S | 14% |
| Air Entraining Agent | to achieve 14% mortar air content |

Example 7

ASTM C-91 Type S

| | |
|---|---|
| Rockdale Fly Ash | 58% |
| Capitol Portland | 30% |
| APG Hydrated Line, Type S | 12% |
| Air Entraining Agent | to achieve 14% mortar air content |

Example 8

ASTM C-91 Type S Standards for Masonry Cement

| | |
|---|---|
| Rockdale Fly Ash | 43% |
| Sun Belt Portland Type 1 | 28% |
| Parish Fly Ash | 12% |
| APG Hydrated Lime, Type S | 17% |
| Air Entraining Agent | to achieve 14% mortar air content |

Example 9

ASTM C-1329 Type N standards for mortar cement

This mortar when tested according to ASTM E-514 for water permeability passed not only the 4 hour test, but an additional 20 hours.

| | |
|---|---|
| Rockdale Fly Ash | 45% |
| Sun Belt Portland Type 1 | 37% |
| APG Hydrated Lime, Type S | 17% |
| Air Entraining Agent | to achieve 14% mortar air content |

Example 10

ASTM C-1328 Type S standards for stucco (plastic) cement

| | |
|---|---|
| Martin Lake Fly Ash | 48% |
| Sun Belt Portland Type 1 | 44% |
| APG Hydrated Lime, Type S | 11% |
| Air Entraining Agent | to achieve 12% mortar air content |

Example 11

ASTM C-91 Type N standards for masonry cement

| | |
|---|---|
| Rio Grande Pozzolan, ASTM C-618 Class N | 65% |
| Capitol Portland Type 1 | 5% |
| Austin White Lime Type N | 30% |
| Air Entraining Agent | to achieve 14% mortar air content |

Rio Grande Pozzolan is calcined and milled volcanic ash mined in Starr Co., Tx.

Example 12

ASTM C-91 Class N Masonry Cement

| | |
|---|---|
| Rio Grande Pozzolan, ASTM C-618 Class N | 60% |
| Capitol Portland Type 1 | 10% |
| Austin White Lime Type N | 30% |
| Air Entraining Agent | to achieve 14% mortar air content |

Example 13

Efficacy Data

A. ASTM C-91 and ASTM C-270

When tested according to ASTM C-91 and ASTM C-270 test procedures, mortars produced with this invention require less mixing water than mortars produced with conventional technology, thus the water/cement ratio is more favorable for development of strength and there is less water in the mix so fewer solution voids will be present in the hardened mortar.

When Pozzolanic Masonry Cement Type N-Example 1 was mixed in the lab and tested according to ASTM C-91 (480 grams), 206 ml of water are required to obtain a flow of 1–5% to 115%.

When samples of competing products are mixed with the same proportion of cementitious, and sand and sufficient water to achieve a similar flow, the following amounts of water were needed:

| PRODUCT COMMERCIALLY AVAILABLE | WATER REQUIRED |
|---|---|
| Alamo Masonry Cement Type N (San Antonio, Texas) | 218 ml |
| Capitol Type N Masonry Cement (San Antonio, Texas) | 225 ml |
| Texas Lehigh White Masonry Cement Type N (Buda, Texas) | 224 ml |
| APG Hill Country Blend Mortar Cement Type N (New Braunfels, Texas) | 298 ml |

B. ASTMC-1328

When tested according to ASTM C-1328 test procedures, stucco cements produced with this invention require less mixing water than stucco cements produced with conventional technology, thus the water/cement ratio is more favorable for development of strength.

When Pozzolanic Plastic (Stucco) Cement Type S (Example 3) was mixed in the lab and tested according to ASTM C-1328, 198 ml of water with a sample size of 545 grams were required to obtain a flow of 105% to 115%.

When samples of competing products are mixed with the same proportion of cementitious, and sand and sufficient water to achieve a similar flow, the following amounts of water were needed:

| PRODUCT | WATER REQUIRED |
|---|---|
| Colton Plastic Cement | 226 ml |
| Riverside Plastic Cement | 231 ml |
| Blind Sample A submitted by Magna Wall | 248 ml |
| Blind Sample B submitted by Magna Wall | 280 ml |
| Blind Sample C submitted by Magna Wall | 258 ml |
| Western One-Coat Gun Cement | 229 ml |

C. Efflorescence

When compared with conventional mortars, and stuccos, mortars and stuccos produced with this invention are less likely to effloresce with alkali metal compounds (temporary efflorescence) and with alkaline earth compounds (permanent efflorescence).

Reasons for the reduced efflorescence are:

Less alkali metal compounds in the mortar,

Less mixing water is used in forming the mortar so it tends to be less permeable, Better particle size distribution due to the tri-modal particle size distribution of the fly ash and thus less permeable, Pozzolans in the mortar react with the soluble alkaline earth (usually calcium) hydroxides and tie them up so they cannot migrate to the surface and deposit on the surface, The reaction between pozzolans and the soluble alkaline earth hydroxides tends to plug solution channels making the mortar even less permeable and therefore more resistant to efflorescing tendencies.

The lower tendency to effloresce can be demonstrated with a modified ASTM C-67 test of brick for efflorescence.

When Pozzolanic Masonry Cement Type N-Example 1 was mixed in the lab without sand, and formed in to 1"×1"×12" bars and tested according to the ISG in-house Efflorescence Test, no alkali or alkaline earth efflorescence is noted.

When Pozzolanic Masonry Cement Type S-Example 2 was mixed in the lab without sand, and formed in to 1"×1"×12" bars and tested according to the ISG in-house Efflorescence Test, no alkali or alkaline earth efflorescence is noted.

When Pozzolanic Plastic (Stucco) Cement Type S-Example 3 was mixed in the lab without sand, and formed in to 1"×1"×12" bars and tested according to the ISG in-house Efflorescence Test, no alkali or alkaline earth efflorescence is noted.

When the test was performed on other masonry products, the following results were observed:

Alamo Masonry Cement Type N (San Antonio, Tex.)
Very visible permanent efflorescence
Capitol Type N Masonry Cement (San Antonio, Tex.)
Visible permanent efflorescence
APG Hill Country Blend Mortar Ce ment Type New Braunfels, Tex.)
Moderate permanent efflorescence D. Fungi and Algae Mortars and stuccos produced with this invention are less likely to develop fu ngal and algal growth than conventional mortars and stuccos.

Anecdotal data over the years has indicated that high fly ash cements and concretes are more resistant to mold, fungi, algal, and moss growth than cements and concrete that are not made with high fly ash concentrations.

Seven-day results are summarized below:

|  | Example 1 | Example 2 | Example 3 | Example 4 |
|---|---|---|---|---|
| T. thiooxidans | <20 | <20 | <20 | <20 |
| Natural Inoculum | 300 | <20 | <20 | <20 |
| A. niger | 40 | <20 | 260 | <20 |

E. ASTM E-514

Mortars and stuccos produced with this invention are more water-resistant than conventional mortars and stuccos. This can be illustrated by testing according to ASTM E-514.

The following list the results of a water penetration test. The table lists two type N masonry cements, 2 Portland-lime job site mixes, 1 Portland-lime factory blend (Hill Country) and the pozzlonic formula (Best). The test was run for 24 hours. Conditions were equivalent to 5 inches of rain per hour and a 62.5 mph wind. Results were as follows:

|  | No. of Damp brick | Flow rate L/hr |
|---|---|---|
| Masonry cement Type N - 1 (commercially available) | 90 | 4.35 |
| Masonry cement Type N - 2 (commercially available) | 90 | 0.13 |
| Portland-lime - 1 (commercially available) | 90 | 0.0 |
| Portland-lime -2 (commercially available) | 0 | 0.1 |
| Hill Country Type N (commercially available) | 5 | 0.02 |
| Example 4 | 3 | 0.0 |

F. Increase in Strength

Mortars and stuccos produced with this invention continue to gain strength beyond the 28 days.

Most mortars and stuccos have obtained 85% or more of their ultimate strength within 28 days of being mixed when tested according to the ASTM C-91, ASTM C-270, ASTM C-1328, or ASTM C-1329 test procedures. Mortars and stuccos produced according to this invention continue to gain strength after this time. The data reported in the following table supports this claim. These data show that with high pozzolanic mortar formulas that the strength at 90 days is 123 to 231 percent of the strength at 28 days. With conventional mixes the strength at 90 days is 117 percent or less than the strength at 28 days. The strength gains of the Type 1P cement (Sample No. 1780) and the Type 1 cement (Sample No. 2430) illustrate that the pozzolan brings about a continuing strength gain over a longer period than is observed with straight Portland cement. This accounts for a portion of the continuing strength gain but not all of it. The remaining strength gain is a result of continuing pozzolanic action between the pozzolan and the hydrated lime that are in the masonry cements, mortar cements, and plastic cements made with this invention.

| EXAMPLE | TYPE | 3-DAY PSI | 7-DAY PSI | 28-DAY PSI | 90-DAY PSI | 365-DAY PSI | % INCREASE 28-DAY TO 90-DAY | % INCREASE 28-DAY TO 365-DAY |
|---|---|---|---|---|---|---|---|---|
| 1 | TYPE N MASONRY CEMENT |  | 800 | 1650 | 2360 | 3220 | 143% | 195% |
| 2 | TYPE S MASONRY CEMENT |  | 1140 | 2110 | 2660 | 3720 | 126% | 176% |
| 2 | TYPE S MASONRY CEMENT |  | 1210 | 2040 | 2560 | 3300 | 125% | 162% |
| 2 | TYPE S MASONRY CEMENT |  | 1230 | 1820 | 4210 | 5420 | 231% | 298% |
| 2 | TYPE S MASONRY CEMENT | 750 | 1130 | 1820 | 2910 | 4480 | 160% | 246% |
| 3 | TYPE S PLASTIC CEMENT |  | 1710 | 2320 | 3490 | 4910 | 150% | 212% |
| 4 | TYPE N MORTAR CEMENT |  | 1140 | 1680 | 2430 | 3350 | 145% | 199% |
| 4 | TYPE N MORTAR CEMENT | 580 | 1021 | 1940 | 2550 | 3730 | 131% | 192% |
| 4 | TYPE N MORTAR CEMENT |  | 760 | 1440 | 2360 | 3660 | 164% | 254% |
| C | HILL COUNTRY TYPE N MORTAR CEMENT | 980 | 1150 | 1320 | 1390 |  | 105% |  |
| C | TEXAS LEHIGH TYPE N WHITE MASONRY CEMENT |  | 2030 | 2940 | 3450 |  | 117% |  |
| C | SPECTRUM COLORED MASONRY CEMENT | 2180 | 2640 | 2540 | 2850 |  | 112% |  |
| C | ALAMO TYPE S MASONRY CEMENT |  | 2940 | 3270 | 3530 |  | 108% |  |

| EXAMPLE | TYPE | 3-DAY PSI | 7-DAY PSI | 28-DAY PSI | 90-DAY PSI | 365-DAY PSI | % INCREASE 28-DAY TO 90-DAY | % INCREASE 28-DAY TO 365-DAY |
|---|---|---|---|---|---|---|---|---|
| C | CAPITOL TYPE S MASONRY CEMENT | | 2200 | 2760 | 3030 | | 110% | |
| C | MAGNA WALL-CEMEX | 3720 | 3790 | 4890 | 5390 | | 110% | |
| C | 65% PORTLAND - 35% FLY ASH | 2980 | 3450 | 5090 | 6840 | 8000 | 134% | 157% |
| C | 100% PORTLAND | 3630 | 4340 | 5620 | 6100 | 6020 | 109% | 107% |

C = COMPARATIVE

G. Heat Generation

When compared with conventional mortars and stuccos, mortars produced with this invention are less likely to burn the tradesmen's hands since the amount of alkali oxides and hydroxides are lower.

The concentration of active oxides in a mix can be estimated by measuring the amount of heat that is generated when a measured amount of water is mixed with a measured amount of cement and placed in an insulated container. In the following table are the results of 6 such tests.

| PRODUCT | DELTA T 15 MIN DEGREES C. | DELTA T 30 MIN DEGREES C. | DELTA T 60 MIN DEGREES C. | DELTA T 120 MIN DEGREES C. |
|---|---|---|---|---|
| WHITE MASONRY | 5.2 | 6.2 | 9.1 | 13.5 |
| ONE-COAT STUCCO | 5.1 | 5.6 | 6.5 | 8.8 |
| ONE-COAT STUCCO | 3.8 | 4.4 | 5.1 | 6.1 |
| STUCCO | 4.5 | 5.1 | 6.4 | 14.7 |
| SCRATCH & BROWN | 3.7 | 4.8 | 5.0 | 6.6 |
| EXAMPLE 3 | 0.8 | 1.2 | 1.8 | 2.5 |

G. ASTM C-91 Type N

Example 1 of the invention meets the above standard for masonry cement. Test results are:

| | | Standard | Example |
|---|---|---|---|
| 7-day | psi | 500 | 960 |
| 28-day | psi | 900 | 1,760 |
| Water retention | % | 70 | 84 |
| Air content | % | 8–21 | 14 |
| Time of set (ini/final) | minutes | 120/1440 | 250/325 |
| Sieve (325 mesh) | % retained | 24 | 17 |
| Autoclave expansion | % | 1% max | −0.043% |

I. ASTM C-91 Type N

Example 6 of the invention meets the above standard for masonry cement. Test results are:

| | | Standard | Example |
|---|---|---|---|
| 7-day | psi | 500 | 670 |
| 28-day | psi | 900 | 980 |
| Water retention | % | 70 | 86 |
| Air content | % | 8 to 21 | 14 |
| Time of set | minutes | 120/1440 | 140/300 |
| Sieve (325 mesh) | % retained | 24 | 17 |

J. ASTM C-91 Type S

Example 7 of the invention meets the above standard for masonry cement. Test results are:

| | | Standard | Example |
|---|---|---|---|
| 7-day | psi | 1,300 | 1,680 |
| 28-day | psi | 2,100 | 2,590 |
| Water retention | % | 70 | 85 |
| Air content | % | 8 to 19 | 14 |
| Time of set | minutes | 90/1440 | 130/220 |
| Sieve (325 mesh) | % retained | 24 | 18 |

K ASTM C-91 Type S

Example 8 of the invention meets the above standard for masonry cement. Test results are:

| | | Standard | Example |
|---|---|---|---|
| 7-day | psi | 1,300 | 1,640 |
| 28-day | psi | 2,100 | 2,430 |
| Water retention | % | 70 | 87 |
| Air content | % | 8–19 | 14 |
| Time of set | minutes | 90–1440 | 140/290 |
| Sieve (325 mesh) | % retained | 24 | 17 |

L ASTM C-1329 Type N Mortar Cement

ASTM E-514 Water Permeability

Example 4 mortar cement meets the above 1329 standards and when tested according to ASTM E-514 for water permeability, this formula passed not only the 4 hour test, but also an additional 20 hours.

| | | Standard | Example |
|---|---|---|---|
| 7-day | psi | 500 | 1,220 |
| 28-day | psi | 900 | 1,510 |
| Water retention | % | 70 | 84.9 |
| Air content | % | 8–16 | 14 |
| Time of set | minutes | 120/1440 | 250/325 |

-continued

|  |  | Standard | Example |
|---|---|---|---|
| Sieve (325 mesh) | % retained | 24 | 19 |
| Autoclave expansion | % | 1.0% max | 0.06% |
| Flexural bond | psi | 70 | 78.1 |

M. ASTM C-1328 Type S Stucco (Plastic Cement)

Example 3 cement passes the above standards. Test results are:

|  |  | Standard | Example |
|---|---|---|---|
| 7-day | psi | 1300 | 2,190 |
| 28-day | psi | 2100 | 3,250 |
| Water retention | % | 70 | 90.5 |
| Air content | % | 8–20 | 12 |
| Time of set | minutes | 90–1440 | 110/250 |
| Sieve (325 mesh) | % retained | 24 | 14 |

N. ASTM C-91 Type "N"

Example 11 cement meets the above standards for masonry cement.

Test results are:

|  |  | Standard | Example |
|---|---|---|---|
| 7-day | psi | 500 | 550 |
| 28-day | psi | 900 | 1,000 |
| Water retention | % | 70% | 70% |
| Air content | % | 8 to 21 | 8% |
| Time of set | minutes | 120 to 1440 | 240/350 |
| Sieve (325 mesh) | % retained | less than 24 | 5% |

O. Additional Comparative Tests

The Example 4 composition was contrasted against a commercially available Type N lime mortar mix "Hill Country" in many categories. The mortar tests included compression strength, air content, water permeance, and flexural bond.

1. Compression Strength-ASTM C1329

ASTM C1329 is the new standard specification for Mortar Cement. A Type N mortar evaluated to this specification must meet certain physical properties which for compressive strength include 7 day and 28 day minimum values. The proportions of the evaluated mortar are stipulated and the sand required is an Ottawa sand. Specimen curing involves the use of saturated lime water. Twelve 2"×2"×2" cubes were made from each mix. Six cubes were tested at 7 days and 28 days, respectively for comparison to ASTM C1329 minimum values.

2. Compression Strength-ASTM C270

ASTM C270 is the industry standard specification for mortar for unit masonry. It currently address mortar that is classified as a Portland Cement Lime Mortar or a Masonry Cement Mortar. A property specification or a proportion specification are criteria for acceptance. The proportion specification provides required volumes of materials-sand being an ASTM C144 field sand. The property specification provides limitations on compressive strength, water retention and air content using field sand. The proportion specification was selected for this evaluation (1 part Type N mortar mix to 3 parts field sand). Three cubes were made from the proportion by volume test mortar. The cubes were cured for 28 days in a moist room prior to testing.

3. Air Content-ASTM C270

Air Content is determined in accordance with ASTM C91 using a laboratory mortar with proportions and materials for construction. Field sand was used. An air content limit exists for a PCL mortar under the property specification. The limit value depends upon whether reinforcing is incorporated in the mortar.

4. Water Retention-ASTM C270

Minimum water retention is required for a PCT mortar in the property specification of ASTM C270. The property is determined in accordance with ASTM C91.

5. Flexural bond Strength-ASTM C1072

A very important property of mortar is its bond to masonry units. The most current method for small scale specimens in evaluating bond is the bond wrench test method ASIM C1072. The stack bonded prisms 6 units high were constructed in the laboratory, cured in plastic sacks for 28 days and then tested using ASTM C1072 procedure for flexural strength. The masonry unit used was a standard modular clay brick manufactures by ACME Brick Co. and commonly referred to as Trinity Brick. The materials used (except for the mortar mix) matches those used in previous bond strength tests at UTA.

6. Water Permanence

One of the most critical performance properties for exterior masonry is water permeance. A test commonly used for this measurement is ASTM E514. A test panel of at least 12 square ft. of exposed masonry wall sure is subjected to a combination of air pressure (representing a 62½ mph wind loading) and water spray (representing a 5"/hr. rainfall). The ASTM standard calls for the specimen to be built in the laboratory, cured in laboratory, and tested in laboratory. Material and construction representative of filed condition are required.

For this project some modification were made to the standard procedure. The specimens were built outside on a concrete slab, covered with polyethylene for curing and tested at 28 days. The water pressure and air pressure used are the same as called for in ASTM. The reason for the modification is that the Construction Research Center has a large database of water permeance testing for PCL mortars and Masonry cement mortars using the modified procedure. For comparison purposes these modifications were selected. Three walls for each mortar type were evaluated.

Test Results

1. Compression-ASTM C1329

Table 1 gives the 7 day and 28 day test results for Example 4 and Hill Country Mortar Mix Type N mortars. The minimum compression strength requirement of ASTM C1329 are 500 psi and 900 psi for 7 day and 28 day test respectively. Both mortar mixes satisfied the criteria with the Best Masonry mortar being closer to the limits. Both mortar exhibited very reasonable coefficients of variation.

2. Compression-ASTM C270

Table 2 gives the 28 day test results for the two mortars evaluated. Under C270 proportion specification there is no compression strength limit. Under C270 property specification the minimum average compressive strength of cubes at 28 days is 750 psi. Both mortars easily exceed this limit with the Example 4 mortar being closer to the limit 3. Air Content-ASTM C270

Table 2 gives the air content determined in accordance with ASTM C91. The maximum air content for a C270 PCL mortar under the property specification is 14%. Both evaluated mortar easily meet this criteria 4. Water Retention Table 2 gives the water retention value for each mortar. The minimum water retention per the property specification of C270 is 75%. Both mortars easily satisfied this criteria.

5. Flexural Bond Strength

Table 3 gives the individual and average joint data for the bond wrench tests. From the average stand point the mortars had equivalent bond strength. For this series of test the Example 4 Type N mortar show a little more variability.

6. Water-Penetration

Table 4 gives the individual and average data from the water permeance testing. The data reported includes the number of full brick damp on the backside of the water (max=95 brick) and the volume of water collected on the back side of the wall at the indicated times. Both mortar types performed exceptionally well; however the Example 4 Mortar was superior. There was not a single drop of water collected from any of the walls constructed with the Example 4 Mortar.

Comparisons

Over the years the Construction Research Center has conducted a significant number of Flexural Bond and Water Permeance Test of various mortar types using the Trinity Brick. Tables 5 and 6 give the average data comparing the Example 4 Type N mortar performance with that of the other Type N mortars with respect to bond strength and water permeance respectively. Needless to say the Example 4 product performed exceptionally well in these comparisons.

TABLE 1

COMPRESSION CUBES - ASTM C1329

| Mortar Mix | Specimen No. | 7 day strength psi | 28 day strength psi |
|---|---|---|---|
| HILL COUNTRY | 1 | 1790 | 1930 |
| | 2 | 1690 | 1915 |
| | 3 | 1910 | 1945 |
| | 4 | 1680 | 1765 |
| | 5 | 1695 | 2045 |
| | 6 | 1780 | 2005 |
| | Average psi | 1758 | 1934 |
| | S psi | 88.6 | 96.4 |
| | V % | 5.0 | 5.0 |
| EXAMPLE 4 | 1 | 815 | 1270 |
| | 2 | 835 | 1330 |
| | 3 | 815 | 1220 |
| | 4 | 830 | 1205 |
| | 5 | 840 | 1270 |
| | 6 | 805 | 1320 |
| | Average psi | 823 | 1269 |
| | S psi | 13.7 | 50.6 |
| | V % | 1.7 | 4.0 |

TABLE 2

ASTM C270 PROPERTIES - 28 DAY TEST

| MORTAR MIX | SPECIMEN NO. | COMPRESSION STRESS PSI | AVERAGE COMPRESSION PSI | S PSI | V % | AIR % | WATER RETENTION |
|---|---|---|---|---|---|---|---|
| HC | 1 | 1730 | | | | | |
| | 2 | 1790 | 1818 | 105.4 | 5.8 | 5.8 | 93.4 |
| | 3 | 1935 | | | | | |
| EXAMPLE 4 | 1 | 1015 | | | | | |
| | 2 | 1045 | 1005 | 45.8 | 4.6 | 4.9 | 94.5 |
| | 3 | 955 | | | | | |

TABLE 3

FLEXURAL BOND STRENGTH - 28 DAY TESTS

| Joint | Load Lbs | Stress psi | Avg. psi | S psi | Co V % |
|---|---|---|---|---|---|
| HILL COUNTRY TYPE N | | | | | |
| 1 | 58.3 | 96.7 | 83.3 | 11.4 | 13.7 |
| 2 | 42.7 | 72.9 | | | |
| 3 | 41.5 | 71.1 | | | |
| 4 | 49.5 | 83.3 | | | |
| 5 | 55.5 | 92.5 | | | |
| 1 | 41.8 | 71.5 | 78.7 | 18.5 | 23.5 |
| 2 | 34.5 | 60.4 | | | |
| 3 | 64.5 | 106.2 | | | |
| 4 | 52.8 | 88.3 | | | |
| 5 | 39.0 | 67.2 | | | |
| 1 | 53.0 | 88.7 | 71.9 | 20.3 | 28.2 |
| 2 | 35.0 | 61.1 | | | |
| 3 | 59.5 | 98.6 | | | |
| 4 | 30.0 | 53.5 | | | |
| 5 | 32.8 | 57.5 | | | |
| AVERAGE | | | 78.0 | 16.6 | 21.3 |
| EXAMPLE 4 TYPE N | | | | | |
| 1 | 22.5 | 42.0 | 82.0 | 34.1 | 41.5 |
| 2 | 70.5 | 115.4 | | | |
| 3 | 27.8 | 50.0 | | | |
| 4 | 55.5 | 92.5 | | | |
| 5 | 67.0 | 110.1 | | | |
| 1 | 37.2 | 64.6 | 78.6 | 21.0 | 26.7 |
| 2 | 34.8 | 60.7 | | | |
| 3 | 60.5 | 100.1 | | | |
| 4 | 37.3 | 64.6 | | | |
| 5 | 62.6 | 102.8 | | | |
| 1 | 61.0 | 100.9 | 73.7 | 17.9 | 24.3 |
| 2 | 32.3 | 56.9 | | | |
| 3 | 34.5 | 60.4 | | | |
| 4 | 48.5 | 81.7 | | | |
| 5 | 40.0 | 68.8 | | | |
| AVERAGE | | | 78.1 | 17.9 | 30.3 |

TABLE 4

WATER PERMEANCE - 28 DAY TESTS

| MORTAR TYPE | WALL # | 4 HOUR DAMP BRICK # | VOLUME WATER ml | 24 HOUR DAMP BRICK # | VOLUME WATER ml |
|---|---|---|---|---|---|
| HC | 1 | 2 | 2 | 12 | 18 |
| HC | 2 | 0 | 0 | 3 | 11 |
| HC | 3 | 0 | 1 | 1 | 32 |
| AVERAGE | | 0 | 0 | 3 | 0 |
| Example 4 | 1 | 0 | 0 | 0 | 0 |
| Example 4 | 2 | 0 | 0 | 6 | 0 |

TABLE 4-continued

WATER PERMEANCE - 28 DAY TESTS

| MORTAR TYPE | WALL # | 4 HOUR DAMP BRICK # | VOLUME WATER ml | 24 HOUR DAMP BRICK # | VOLUME WATER ml |
|---|---|---|---|---|---|
| Example 4 | 3 | 0 | 0 | 2 | 0 |
| AVERAGE | | 0 | 0 | 3 | 0 |

TABLE 5

AVERAGE BOND STRENGTH 28-DAY TESTS

| MORTAR TYPE | BOND STRENGTH PSI | V % |
|---|---|---|
| 1 MC-N | 52 | — |
| 2 MC-N | 59 | 41 |
| 1 PCL | 107 | 32.0 |
| 2 PCL | 85 | — |
| HC | 78 | 21.3 |
| EXAMPLE 4 | 78.1 | 30.3 |

TABLE 6

WATER PENETRATION - 28 DAY TESTS

| MORTAR TYPE | DAMP BRICK NO 1 DAY | FLOW RATE LITERS/HR 1 DAY |
|---|---|---|
| 1 MC-N | 90 | 4.35 |
| 2 MC-N | 90 | 0.13 |
| 1 PCL | 90 | 0 |
| 2 PCL | 0 | 0.1 |
| HC | 5 | 0.02 |
| EXAMPLE 4 | 3 | 0 |

It is apparent that masonry cements, masonry mortar and stucco compositions are provided in accordance with the invention that comply with the above identified ASTM standards while incorporating high pozzolanic constituent contents in such mixes.

| 1 - Portland Cement; | 5–60 wt % |
|---|---|
| 2 - Pozzolan selected from Class "N", Class "F" fly ash and Class "C" fly ash and mixtures thereof; and | greater than 25 wt % |
| 3 - Lime | 0–30 wt % |

With the foregoing adding up to 100 wt %. Water and sand are of course provided until the desired workability is obtained while keeping the ultimately desired compressive strength in mind. Conventional air entraining agent(s) are provided until the entrained air content is between about 8–22 wt %.

Preferred compositions include:

| 1 - Portland Cement | 5–60 wt % |
|---|---|
| 2 - Pozzolan selected from Class "N" pozzolan, Class "F" fly ash and Class "C" fly ash and mixtures thereof | greater than 35 wt % |
| 3 - Lime | 10–30 wt % Foregoing adding up to 100 wt % |

More preferred compositions include:

| 1 - Portland Cement | 5–60 wt % |
|---|---|
| 2 - Pozzolan (as per above) | greater than about 40 wt % |
| 3 - Lime | 10–30 wt % Foregoing adding up to 100 wt % |

Most preferred are compositions including:

| 1 - Portland Cement | 5–45 wt % |
|---|---|
| 2 - Pozzolan | 45–70 wt % |
| 3 - Lime | 10–30 wt % Foregoing adding up to 100 wt % |

In addition to Portland cement, pozzolan, lime, water and sand, as set forth above, other components such as thickeners, water retention aids, and fibers can be added to obtain desired properties.

While we have shown and described herein certain embodiments of our invention, it is intended that these be covered as well as any change or modification therein which may be made without departing from the spirit and scope of the invention as defined in the appended claims.

What is claimed is:

1. Cementitious mortar or stucco composition comprising (a) Portland cement, (b) hydrated lime and (c) pozzolanic material selected from the group consisting of Class "F" fly ash, Class "C" fly ash and Class "N" pozzolan, and mixtures thereof, said (a) (b) and (c) adding up to 100 wt %, said Portland cement (a) being present in an amount of about 5–45 wt %, said hydrated lime (b) being present in an amount of about 10–30 wt % and said pozzolanic material (c) being present in an amount of greater than about 45 wt %.

2. Composition as recited in claim 1, said composition meeting or exceeding the standards of ASTM C-91 Type "N" masonry cement.

3. Composition as recited in claim 1, said composition meeting or exceeding the standards of ASTM 1329 Type N mortar cement.

4. Composition as recited in claim 1, said composition meeting or exceeding the standards set forth in ASTM C-1328 Type S stucco cement.

5. Composition as recited in claim 1 comprising about 50 wt % Class "F" fly ash, about 12 w % hydrated lime, and about 38 wt % Portland cement, said composition being useful as a Type "S" masonry cement.

6. Composition as recited in claim 1 comprising about 63 wt % of Class "F" fly ash, about 12 wt % hydrated lime, and about 25 wt % Portland cement, said composition being useful as a Type "N" masonry cement.

7. Composition as recited in claim 1 comprising about 46 wt % Class "F" fly ash, about 43 wt % Portland cement and about 11 wt % hydrated lime, said composition being useful as a stucco type "S" cement.

8. Cementitious composition as recited in claim 1 comprising about 50 wt % Class "F" fly ash, about 33 wt % Portland cement, and about 17 wt % hydrated lime, said composition being useful as a type "N" masonry mix.

9. Cementitious composition as recited in claim 1 comprising about 50 wt % Class "F" fly ash, about 22 wt % Portland cement, about 14 wt % Class "C" fly ash and about 14 wt % hydrated lime, said composition being useful as a Type N masonry cement.

10. Cementitious composition as recited in claim 1 comprising about 58 wt % Class "F" fly ash, about 30 wt % Portland cement and about 12 wt % hydrated lime, said composition being useful as a Type S masonry cement.

11. Cementitious composition as recited in claim 1, comprising about 43 wt % Class "F" fly ash, about 28 wt % Portland cement, about 12 wt % Class "C" fly ash, and about 17 wt % hydrated lime, said composition being useful as a Type S masonry.

12. Cementitious composition as recited in claim 1 comprising about 45 wt % Class "F" fly ash, about 37 wt % Portland cement and about 17 wt % hydrated lime, said composition being useful as a Type "N" mortar cement.

13. Cementitious composition as recited in claim 1 comprising about 48 wt % Class "F" fly ash, about 44 wt % Portland cement, and about 11 wt % hydrated lime, said composition being useful as a Type "S" stucco.

14. Cementitious composition as recited in claim 1 comprising about 60 wt % Class "N" pozzolan, about 10 wt % Portland cement, and about 30 wt % hydrated lime, said composition being useful as a Type N masonry cement.

15. Cementitious composition as recited in claim 1 comprising about 15–30% by weight Class "C" fly ash, about 30–60 wt % Class "F" fly ash, about 15–45% Portland cement and about 10–20% hydrated lime.

* * * * *